Patented Oct. 3, 1922.

1,430,864

UNITED STATES PATENT OFFICE.

KARL B. THEWS, OF SAWPIT, COLORADO, ASSIGNOR TO COLORADO VANADIUM CORPORATION, OF NEW YORK, N. Y., A CORPORATION OF COLORADO.

PROCESS OF RECOVERING VANADIUM.

No Drawing.   Application filed October 29, 1920.   Serial No. 420,488.

*To all whom it may concern:*

Be it known that I, KARL B. THEWS, a citizen of the United States of America, residing at Sawpit, in the county of San Miguel and State of Colorado, have invented certain new and useful Improvements in Processes of Recovering Vanadium, of which the following is a specification.

This invention relates to a process of recovering vanadium, and aims to provide improvements therein.

The invention provides a process involving the precipitation of soluble vanadates, especially from impure solutions, in the form of calcium vanadate, wherein cleaner and more pure precipitates are secured, and wherein, consequently, in the further treatment of the precipitate, a final product (usually vanadic oxid) of high purity is obtained.

The invention further provides improvements in steps and subcombinations of steps of the process of recovering vanadium whereby a vanadate precipitate is formed.

Solutions of soluble vanadates, obtained by direct leaching of vanadium ores, or by leaching ores which have been heated with a flux, or otherwise, almost invariably are contaminated with iron and aluminum salts or compounds, and, in the precipitation of the vanadium constituent from such ores, by the use of a calcium reagent, the precipitate is contaminated with such iron and aluminum; in fact, calcium precipitates obtained by previous methods have been of very low vanadium content, with relatively high iron and aluminum content.

According to the present invention, to such impure solutions of soluble vanadates, enough of an acid is added to render the solution slightly acid, and the solution is thoroughly stirred, to render the condition of acidity uniform throughout. Any mineral or organic acid, as a general thing, may be used. In particular, hydrochloric or sulphuric acid may be advantageously used.

To the slightly and uniformly acid solution, there is then added, with stirring, a calcium reagent, conveniently a solution of calcium chloride, or milk of lime, and the conditions of uniform slight acidity of the solution are maintained during the addition of the reagent.

The condition of acidity apparently stimulates the reaction between the calcium ion and the vanadic acid ion, and decreases the tendency of the iron and aluminum ions to unite with the vanadic acid ion, as the precipitate which comes down is a calcium vanadate of high purity, and a clean separation between the calcium vanadate and the iron and aluminum salts in solution is effected.

The addition of the calcium reagent is continued until the quantity of the precipitate which is formed indicates that the amount of vanadic acid ions in solution is nearly exhausted.

After the precipitation is complete, the precipitated calcium vanadate is conveniently separated from the solution by filtration.

The calcium vanadate may be further treated in any suitable manner.

Preferably, however, the calcium vanadate is treated to obtain a final product in the form of an oxid of vanadium, i. e., vanadic oxid ($V_2O_5$).

Therefore, according to the present invention, a dilute acid solution is added to the calcium vanadate, together with calcium chloride. The calcium vanadate undergoes dissociation or decomposition in this solution, the calcium reacting with the acid, and the vanadic oxid precipitating as such, being insoluble in the acid solution in the presence of calcium chloride.

In general, any acid may be used which does not form a precipitate with calcium, though hydrochloric acid is preferred.

The precipitated vanadic oxid ($V_2O_5$) is separated from the solution, conveniently by filtration, and ordinarily has a purity of from 95% to 99%.

The invention may be practiced in other modes of procedure than that herein specifically described.

What is claimed is:

1. In a process of recovering vanadium, precipitating calcium vanadate from a solution of soluble vanadates contaminated with iron and aluminum compounds by adding a calcium reagent, and maintaining the solution acid, to deter the precipitation of iron or aluminum compounds or complexes, whereby to obtain a clean and relatively pure calcium vanadate precipitate.

2. In a process of recovering vanadium, precipitating calcium vanadate from a solution of soluble vanadates contaminated with iron and aluminum compounds, by adding calcium chloride, and maintaining the solution acid, to deter the precipitation of iron or aluminum compounds or complexes, whereby to obtain a clean and relatively pure calcium vanadate precipitate.

3. In a process of recovering vanadium, rendering acid a solution of soluble vanadates contaminated with iron and aluminum compounds, and precipitating from said acid solution calcium vanadate by adding a calcium reagent, whereby the precipitation of iron or aluminum compounds or complexes is deterred, and a precipitation of a clean and relatively pure calcium vanadate secured.

In witness whereof I have hereunto signed my name.

KARL B. THEWS.

Witnesses:
JOE TURNER,
C. R. MORRIS.